US010682021B2

(12) United States Patent
Ziegenbein

(10) Patent No.: US 10,682,021 B2
(45) Date of Patent: *Jun. 16, 2020

(54) SOFT SANITARY TISSUE PAPER WEB PRODUCTS COMPRISING NANO-FILAMENTS

(71) Applicant: Mercer International Inc., Vancouver (CA)

(72) Inventor: Tobias Ziegenbein, Vancouver (CA)

(73) Assignee: Mercer International Inc., Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/587,096

(22) Filed: Sep. 30, 2019

(65) Prior Publication Data

US 2020/0022537 A1 Jan. 23, 2020

Related U.S. Application Data

(63) Continuation of application No. 15/637,015, filed on Jun. 29, 2017, now Pat. No. 10,463,205.

(51) Int. Cl.
| A47K 10/16 | (2006.01) |
| D21H 11/00 | (2006.01) |
| B32B 21/13 | (2006.01) |
| B32B 29/00 | (2006.01) |
| D21H 21/52 | (2006.01) |
| B32B 23/10 | (2006.01) |
| B32B 5/26 | (2006.01) |
| B32B 7/12 | (2006.01) |
| D21H 27/00 | (2006.01) |
| D21H 11/18 | (2006.01) |
| D21H 27/30 | (2006.01) |
| D21H 23/76 | (2006.01) |
| B82Y 40/00 | (2011.01) |
| D21C 9/00 | (2006.01) |
| B82Y 99/00 | (2011.01) |

(52) U.S. Cl.
CPC .............. *A47K 10/16* (2013.01); *B32B 5/26* (2013.01); *B32B 7/12* (2013.01); *B32B 21/13* (2013.01); *B32B 23/10* (2013.01); *B32B 29/005* (2013.01); *D21C 9/002* (2013.01); *D21H 11/00* (2013.01); *D21H 11/18* (2013.01); *D21H 21/52* (2013.01); *D21H 23/76* (2013.01); *D21H 27/002* (2013.01); *D21H 27/007* (2013.01); *D21H 27/30* (2013.01); *B32B 2255/26* (2013.01); *B32B 2262/0223* (2013.01); *B32B 2262/0253* (2013.01); *B32B 2262/0261* (2013.01); *B32B 2262/0276* (2013.01); *B32B 2262/06* (2013.01); *B32B 2262/062* (2013.01); *B32B 2262/067* (2013.01); *B32B 2262/08* (2013.01); *B32B 2262/10* (2013.01); *B32B 2262/101* (2013.01); *B32B 2262/14* (2013.01); *B32B 2307/718* (2013.01); *B32B 2307/73* (2013.01); *B32B 2307/732* (2013.01); *B32B 2555/00* (2013.01); *B82Y 40/00* (2013.01); *B82Y 99/00* (2013.01)

(58) Field of Classification Search
CPC ...... D21H 27/002; D21H 11/18; D21H 27/30; D21H 11/20; D21H 21/20; D21H 21/52; D21H 27/005; D21H 27/007; A47K 10/16; B32B 5/26; B32B 23/10; D21F 11/14; B82Y 40/00; B82Y 99/00; D04H 1/42; Y10T 428/25
See application file for complete search history.

(56) References Cited

U.S. PATENT DOCUMENTS

| 4,374,702 | A | * | 2/1983 | Turbak | ..................... D01D 5/11 162/100 |
| 5,964,983 | A | * | 10/1999 | Dinand | .................. C09K 8/206 162/187 |
| 6,183,596 | B1 | * | 2/2001 | Matsuda | ................ D21C 9/007 162/100 |
| 6,231,657 | B1 | * | 5/2001 | Cantiani | ................ A61K 8/027 106/162.8 |
| 9,988,762 | B2 | * | 6/2018 | Bilodeau | .................. D21D 1/30 |
| 10,463,205 | B2 | * | 11/2019 | Ziegenbein | ............ A47K 10/16 |
| 2009/0022983 | A1 | * | 1/2009 | Cabell | ....................... D04H 5/02 428/338 |
| 2011/0277947 | A1 | * | 11/2011 | Hua | ....................... D21H 15/00 162/28 |
| 2012/0080156 | A1 | * | 4/2012 | Laleg | ..................... D21H 11/18 162/158 |
| 2014/0004307 | A1 | * | 1/2014 | Sheehan | .............. A61K 8/0208 428/156 |
| 2015/0275433 | A1 | * | 10/2015 | Dorris | ........................ C08J 5/18 162/157.6 |

(Continued)

FOREIGN PATENT DOCUMENTS

| CA | 2824191 A1 * | 7/2012 | .............. D21D 1/20 |
| CA | 2972121 A1 * | 1/2018 | ............. D21C 9/002 |

(Continued)

Primary Examiner — Jose A Fortuna
(74) Attorney, Agent, or Firm — Stephen T. Murphy Law LLC; Peter D. Meyer; Stephen T. Murphy

(57) ABSTRACT

A differential density soft sanitary tissue paper web comprising at least one ply. The differential density soft sanitary tissue paper web comprises from about 2% to about 56.5% of a softwood pulp fiber mixture and from about 43.5% to about 99.9% of a hardwood pulp fiber mixture. The softwood pulp fiber mixture comprises from about 0% to about 56.4% of softwood pulp fiber; from about 0.05% to about 20.0% of cellulose nanofilaments; and, from about 0.05% to about 3.0% of strengthening additive.

20 Claims, 1 Drawing Sheet

(56) References Cited

U.S. PATENT DOCUMENTS

| | | | | |
|---|---|---|---|---|
| 2015/0322606 A1* | 11/2015 | Strlin | ................ | D04H 5/03 |
| | | | | 442/59 |
| 2016/0215179 A1* | 7/2016 | Sumnicht | ............... | C09J 129/04 |
| 2017/0000695 A1* | 1/2017 | Castillo | .................. | B32B 29/02 |
| 2017/0009401 A1* | 1/2017 | O'Brien Stickney | ....................... | |
| | | | | D21H 27/005 |
| 2017/0021589 A1* | 1/2017 | Burt | ......................... | B32B 5/26 |
| 2017/0284025 A1* | 10/2017 | Cabell | ................. | D21H 27/004 |
| 2018/0002502 A1* | 1/2018 | Ziegenbein | ................ | C08J 5/18 |
| 2018/0002864 A1* | 1/2018 | Ziegenbein | ................ | C08J 5/18 |
| 2018/0078099 A1* | 3/2018 | Ziegenbein | ............ | D21C 9/002 |
| 2018/0187377 A1* | 7/2018 | Ziegenbein | ............ | D21H 17/44 |
| 2018/0195239 A1* | 7/2018 | Ziegenbein | ............ | D21H 17/44 |
| 2018/0209101 A1* | 7/2018 | Cabell | ................... | D21H 27/30 |
| 2019/0316293 A1* | 10/2019 | Ziegenbein | ............ | D21H 11/16 |
| 2020/0022537 A1* | 1/2020 | Ziegenbein | ............ | D21H 21/52 |
| 2020/0022538 A1* | 1/2020 | Ziegenbein | ............ | D21H 23/76 |
| 2020/0024803 A1* | 1/2020 | Ziegenbein | ............ | D21H 21/06 |

FOREIGN PATENT DOCUMENTS

| | | | | |
|---|---|---|---|---|
| CA | 2972127 A1 * | 1/2018 | ............... | C08J 5/18 |
| CA | 2972129 A1 * | 1/2018 | ............... | C08J 5/15 |
| CA | 2979488 A1 * | 3/2018 | ............... | D21H 17/44 |
| WO | WO-2012097446 A1 * | 7/2012 | ............... | D21D 1/20 |
| WO | WO-2018005919 A1 * | 1/2018 | ............... | D21C 9/002 |
| WO | WO-2018005971 A1 * | 1/2018 | ............... | C08J 5/18 |
| WO | WO-2018006061 A1 * | 1/2018 | ............... | C08J 5/18 |

* cited by examiner

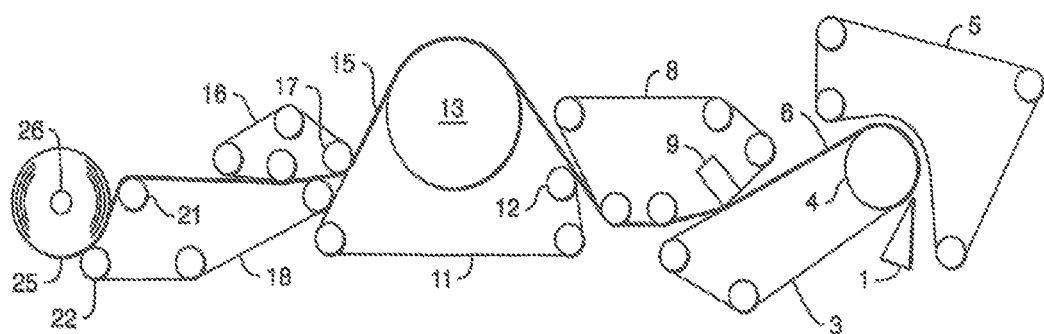

SOFT SANITARY TISSUE PAPER WEB PRODUCTS COMPRISING NANO-FILAMENTS

FIELD OF THE INVENTION

The present disclosure relates to soft sanitary tissue paper webs comprising cellulose nano-filaments and/or blends of cellulose micro-filaments and cellulose nano-filaments.

BACKGROUND OF THE INVENTION

Tissue/towel paper products such as facial tissues, paper towels, bath tissues, napkins and other similar products, are designed to include several important properties. For example products should have good bulk, good absorbency, a soft feel, and should have good strength and durability. Unfortunately, when steps are taken to increase one property of the product, the other characteristics of the product are often adversely affected.

Formulators have for years attempted to balance the level of softwood fibers in their paper structures to ensure adequate strength of their structures while at the same time trying to minimize the negative impact on softness, durability or absorbency generally resulting from higher levels of softwood fibers. One example of the problem has been that formulators of bath tissue products have been unable to reliably make acceptable fibrous structures, for example multi-density structures made by through-air-dried ("TAD") processes, that contain less than 20% by weight softwood fibers on a dry fiber basis without requiring excessive refining of the softwood fibers and/or adding excessive chemical strength agents to achieve the desired level of strength and/or reliability (avoid sheet breaks during making and/or processing).

Similarly, for paper toweling products, formulators work to develop new products that have higher in-use strength at lower or equal dry strength. However, as formulators use typical paper making process variables to increase product in-use or wet strength, other consumer desired attributes such as absorbency and/or softness typically decrease. The typical problem formulators struggle with for paper toweling is how to increase towel in use or wet strength while maintaining or improving softness and/or absorbency, or how to decrease softwood inclusion while maintaining total product strength and/or sheet flexibility. All of the normal paper making process variables available to a papermaker for increasing strength, normally can negatively affect the sheet feel and product absorbency.

Accordingly there continues to be a need for new fibrous paper structures that further optimize the physical product performance of tissue and towel products that increase wet and dry strength without sacrificing as much softness, absorbency and paper making reliability. Such structures are especially valuable for multi-density paper making structures with non-limiting examples of such structures being through air dried, Fabric Crepe. NTT, ATMOS and UCTAD processes.

SUMMARY OF THE INVENTION

The present disclosure provides for a soft sanitary tissue paper web comprising at least one ply. The soft sanitary tissue paper web comprises from about 2% to about 56.5% by weight of the soft sanitary tissue paper web of a softwood pulp fiber mixture and from about 43.5% to about 99.9% by weight of the dry fiber basis of the soft sanitary tissue paper web of a hardwood pulp fiber mixture. The softwood pulp fiber mixture comprises from about 0% to about 56.4% by weight of the dry fiber basis of the soft sanitary tissue paper web of softwood pulp fiber; from about 0.05% to about 20.0% by weight of the dry fiber basis of the soft sanitary tissue paper web of cellulose nanofilaments; and, from about 0.05% to about 3.0% by weight of the dry fiber basis of the soft sanitary tissue paper web of strengthening additive.

The present disclosure also provides for a soft sanitary tissue paper web comprising at least one ply. The soft sanitary tissue paper web comprises from about 2% to about 56.5% by weight of by weight of the dry fiber basis of the soft sanitary tissue paper web of a softwood pulp fiber mixture, from about 0.05% to about 3.0% by weight of the by weight of the dry fiber basis of the soft sanitary tissue paper web of strengthening additive; and, from about 43.5% to about 99.9% by weight of the by weight of the dry fiber basis of the soft sanitary tissue paper web of a hardwood pulp fiber mixture. The softwood pulp fiber mixture comprises from about 0% to about 56.4% by weight of the dry fiber basis of the soft sanitary tissue paper web of a softwood pulp fiber; and, at least about 0.05% to about 20% by weight of the dry fiber basis of the soft sanitary tissue paper web of a blend of cellulose micro-filaments and cellulose nano-filaments. The blend of cellulose micro-filaments and cellulose nano-filaments comprises at least about 50% by weight of the blend of cellulose micro-filaments and cellulose nano-filaments of cellulose micro-filaments and cellulose nano-filaments; at least about 10% by weight of the blend of cellulose micro-filaments and cellulose nano-filaments of intact fibrillated fibers; and at least about 5% by weight of the blend of cellulose micro-filaments and cellulose nano-filaments of cellulosic fines.

BRIEF DESCRIPTION OF THE DRAWINGS

FIG. 1. is a schematic diagram of one embodiment of a process for making an absorbent through-air dried tissue web product for use in the present disclosure.

DETAILED DESCRIPTION OF THE INVENTION

The present invention relates to a process for making absorbent tissue or towel paper webs. The processes of the present invention produce fibrous structures that contains natural and/or man-made fibers and cellulose nanofilaments that allow enhanced properties and/or the ability to greatly reduce softwood content without negatively affecting paper machine run-ability, sheet strength and/or other desired sheet attributes. More particularly, the present invention relates to processes of making fibrous structures that contain long and short natural and/or man-made (regenerated cellulose) fibers, and whereby cellulose nanofilaments are added at a range of from about 0.05% to about 20.0% weight percentage of the dry fiber basis of the sheet, to the softwood stream, either before or after refining. In a preferred embodiment the cellulose nanofilaments are added to the softwood stream after the stream has been combined with either temporary or permanent strengthening additives to form a mixed aqueous softwood fiber stream.

For non-layered products this mixed aqueous softwood stream is mixed with the other aqueous streams, including other natural fiber streams, synthetic fiber stream and other man-made (regenerated cellulose) fiber materials, and fed to the paper machine for production of the paper web. Alternatively, for layered products the softwood fiber/cellulose nanofilament stream is fed to a layer or layers of the head box that are separate from the hardwood or surface layer of the sheet. The formed aqueous fiber sheet is then dewatered and dried on the paper machine for the production of the paper web.

As used herein, "Paper Product" refers to any formed, fibrous structure products, traditionally, but not necessarily, comprising cellulose fibers. In one embodiment, the paper products of the present invention include absorbent towel products. In an alternative embodiment, the paper products of the present invention include soft sanitary tissue products.

The paper product of the present disclosure refers to paper products comprising paper tissue products or paper towel products. The disclosed paper technology in general, includes but is not limited to, conventional felt pressed or conventional wet-pressed tissue papers, pattern densified tissue papers, wet creped tissue paper products, through-air dried tissue paper products whether creped or uncreped. For example, a paper making process of the present disclosure can utilize adhesive creping, wet creping, double creping, embossing, wet-pressing, air pressing, through-air drying, creped through-air drying, uncreped through-air drying, as well as other steps in forming the paper web. Some examples of such techniques are disclosed in U.S. Pat. Nos. 4,529,480, 5,048,589, 5,399,412, 5,129,988, 5,494,554, 5,607,551, 6,398,916, 7,744,726 and 8,388,803. When forming multi-ply tissue products, the separate plies can be made from the same process or from different processes as desired. For example, in one embodiment, tissue or towel webs may be creped through-air dried webs formed using processes known the art.

To form such webs, an endless traveling forming fabric, suitably supported and driven by rolls, receives the layered or non-layered paper making stock issuing from the headbox. A vacuum box is disposed beneath the forming fabric and is adapted to remove water from the fiber furnish to assist in forming a web. From the forming wire/fabric, a formed web is transferred to a second fabric by a vacuum assist or mechanical means, and this second template may be either a wire, a felt, or a woven fabric as long as the desired topography is created in the structure of the template. The use of a sheet forming template that creates a paper making structure with a plurality of fiber enriched regions of high local basis weight interconnected with a plurality of lower local basis weight regions. The fabric is supported for movement around a continuous path by a plurality of guide rolls. A pick up roll designed to facilitate transfer of web from fabric to fabric may be included to transfer the web.

Preferably the formed web is dried, preferably by blowing heated air through the formed web and then by transfer to the surface of a rotatable heated dryer drum, such as a Yankee dryer. The drying cylinder is optionally provided with a resinous protective coating layer underneath the resinous adhesive coating composition. The resinous adhesive coating composition is preferably re-wettable. The process is operated such that the adhesive coating is maintained to provide sufficient wet tack strength upon the transfer of the web to the drying cylinder to secure the web during drying. The adhesive resin coating composition is also maintained such that the adhesive coating compositions pliant when dried such that the web may be removed from the drying cylinder without significant sheet damage when drying is accomplished. The web may be transferred to the Yankee directly from the through drying fabric, if the drying fabric has topography, or preferably, transferred to an impression fabric which is then used to transfer the web to the Yankee dryer. The web is then removed from the dryer drum by a creping blade. The creping of the web further reduces internal bonding within the web and increases softness and absorbency.

In other embodiments, the base web is formed by an uncreped through-air dried process. Related uncreped through-air dried tissue processes are described for example, in U.S. Pat. Nos. 5,656,132 and 6,017,417.

The fibrous structures in accordance with the present invention may be in the form of through-air-dried fibrous structures, differential density fibrous structures, differential basis weight fibrous structures, wet laid fibrous structures, air laid fibrous structures, creped or uncreped fibrous structures, pattern-densified or non-pattern-densified fibrous structures, compacted or un-compacted fibrous structures, double re-creped fibrous structures as well known in the art as exemplified in U.S. Pat. Nos. 3,301,746, 3,974,025, 4,191,609 and 4,637,859, 6,398,906. and 8,388,803.

As use herein, the phrase "papermaking furnish" refers to aqueous mixture of either cellulosic or non-cellulosic fibers, paper making functional aids (strength, absorbency or softness improvement), fillers and other paper making process materials that are used to form the papermaking web.

As used herein the phrase "percent (%) by weight of dry fiber basis" refers to the percentage relevant material referenced against the fully dried, "bone dry", fibers and other materials with all water and other volatile materials removed from the papermaking web.

"Fiber", as used herein, means an elongate physical structure having an apparent length greatly exceeding it apparent diameter, i.e. a length to diameter ratio of at least about 10 and less than 200. Fibers having a non-circular cross-section and/or tubular shape are common; the "diameter" in this case may be considered to be the diameter of a circle having cross-sectional area equal to the cross-sectional area of the fiber. More specifically, as used herein, "fiber" refers to fibrous structure-making fibers. The present invention contemplates the use of a variety of fibrous structure-making fibers, such as, for example, natural fibers, such as cellulose nanofilaments and/or wood pulp fibers, non-wood fibers or any suitable fibers and any combination thereof.

Wood fibers; often referred to as wood pulps are liberated from their source by any one of a number of chemical pulping processes familiar to one experienced in the art, including kraft (sulfate), sulfite, polysulfide, soda pulping, etc. Further, the fibers can be liberated from their source using mechanical and semi-chemical processes including, for example, roundwood, thermomechanical pulp, chemomechanical pulp (CMP), chemi-thermomechanical pulp (CTMP), alkaline peroxide mechanical pulp (APMP), neutral semi-chemical sulfite pulp (NSCS), are also contemplated. The pulp can be whitened, if desired, by any one or combination of processes familiar to one experienced in the art including the use of chlorine dioxide, oxygen, alkaline peroxide, and so forth. Chemical pulps, however may be preferred since they impart superior tactile feel and/or desired tissue sheet properties. Pulps derived from both deciduous trees (hereinafter, referred to "hardwood") and coniferous trees (hereinafter, also referred to as "softwood") may be utilized and/or fibers derived from non-woody plants along with man-made fibers. The hardwood, softwood, and/or non-wood fibers can be blended, or alternatively, can be deposited in layers to provide a stratified and/or layered web. U.S. Pat. Nos. 4,300,981 and 3,994,771 disclose layering of softwood and hardwood fibers. Also applicable to the present invention are fibers derived from recycled paper, as well as other non-fibrous materials, such as adhesives used to facilitate the original papermaking and paper converting.

The wood pulp fibers may be short (typical of hardwood fibers) or long (typical of softwood fibers and some non-wood fibers). Softwood fibers derived from the kraft process and originating from more-northern climates may be preferred. These are often referred to as northern bleached softwood Kraft (NBSK) pulps. Softwoods are typically included into paper webs at a variety of levels dependent on the desired product and product features. For example, formulators include softwood fibers into absorbent towel products at a level of from about 20% to about 89.9%, preferably from about 30% from about 70%, more preferably from about 40% to about 60% by weight of the dry fiber basis of the towel product. Further, formulators include softwood fibers into soft sanitary tissue product at a level of below 56.4%, preferably from about 2% to about 45%, more preferably from about 10% to about 35%, and even more preferably from about 20% to about 30% by weight of the dry fiber basis of the tissue product.

Non-limiting examples of short hardwood fibers include fibers derived from a fiber source selected from the group consisting of Acacia, *Eucalyptus*, Maple, Oak, Aspen, Birch, Cottonwood, Alder, Ash, Cherry, Elm, Hickory, Poplar, Gum, Walnut, Locust, Sycamore, Beech, *Catalpa, Sassafras, Gmelin, Albizia*, and *Magnolia*. Non-limiting examples of softwood fibers include fibers deprived from Pine, Spruce, Fir, Tamarak, Hemlock, Cypress, and Cedar. Formulators may include hardwood fibers into absorbent towel products at a level of from about 10% to about 55%, preferably from about 20% from about 50%, more preferably from about 30% to about 40% by weight of the dry fiber basis of the towel product. Further, formulators include hardwood fibers into soft sanitary tissue product at a level of from about 43.5% to about 99.9%, preferably from about 50% to about 80%, and more preferably from about 60% to about 70% by weight of the dry fiber basis of the tissue product.

Another paper making material contemplated within this invention is the inclusion of micro algae as taught in U.S. Pat. No. 8,298,374. For tissues and towels, microalgae can be marine or freshwater microalgae. The microalgae can be selected from, but not limited to, non-motile unicellular algae, flagellates, diatoms and blue-green algae. The microalgae can be selected from, but not limited to, the families of *Dunaliella, Chlorella, Tetraselmis, Botryococcus, Haematococcus, Phaeodactylum, Skeletonema, Chaetoceros, Isochrysis, Nannochloropsis, Nannochloris, Pavlova, Nitzschia, Pleurochrysis, Chlamydomas* or *Synechocystis*. The microalgae will desirably have a size in the longest dimension of less than about 500 μm and preferably less than 300 and even more preferably less than 200 The small size of micro algae coupled with the high retention characteristics of cellulose nanofilaments create unique synergies and paper making applications/structures.

Recycle fiber may be added to the furnish in any amount. While any suitable recycle fiber may be used, recycle fiber with relatively low levels of groundwood is preferred in many cases, for example, recycle fiber with less than 15% by weight lignin content, or less than 10% by weight lignin content may be preferred depending on the furnish mixture employed and the application.

"Fibrillated man-made non-cellulose fibers", also possibly used in paper product and contemplated in this invention are formed by using a cellulosic dope prepared via multiple solvents know by one skilled in the art. This dope is spun into fibers which can be used or further fibrillated and incorporated into the absorbent sheet. Not to be limited to theory, a synthetic cellulose such as lyocell is considered along with modified lyocell that has been reduced in size via refining and other methods to create smaller fibers and fiber segments. U.S. Pat. No. 7,718,036 shows various considered solvents and the inclusion of fibrillated losel in a tissue and towel structure. Fibrillated manmade non-cellulose fibers may optionally be included in the towel or tissue paper webs up to a level of up to about 20%, preferably up to a level of up to about 10%, more preferably up to a level of up to about 5% and more preferably up to a level of up to about 2.5%.

"Non-wood, natural fibrous" structure-making fibers can also be useful in the present invention and can include animal fibers, mineral fibers, plant fibers, man-made spun fibers, and engineered fibrous elements such as cellulose nanofilaments. Animal fibers may, for example be selected from the group consisting of wool, silk, and mixtures thereof. The plant fibers may, for example, be derived from a plant selected from the group consisting of wood, cotton, cotton linters, flax, sisal, abaca, hemp, hesperaloe, jute, bamboo, bagasse, esparto grass, straw, jute, hemp, milkweed floss, kudzu, corn, sorghum, gourd, agave, trichomes, loofah and mixtures thereof. Non-wood, natural fibers may optionally be included in the towel or tissue paper webs up to a level of up to about 20%, preferably up to a level of up to about 10%, more preferably up to a level of up to about 5% and more preferably up to a level of up to about 2.5%.

The present disclosure also contemplates paper web products made from the present processes composed of greater levels of non-wood, natural fibers, for example greater than about 10%, preferably greater than about 20%, more preferably greater than about 50%, and even more preferably greater than about 75% by weight of the dry fiber basis of the paper web of non-wood fibers. As a result, the paper web can be composed of primarily non-wood fiber mixed with other fiber components and/or necessary chemical products, to produce the web efficiently and to meet the consumer product requirements. Non-wood fibers contemplated can either be short, i.e. less than about 1.2 millimeters in length) or long (i.e. greater than 1.2 millimeters in length) or used in combinations of fibers of different lengths, to achieve the desired products. In these structures, the cellulose nanofilaments can be added to either the long fiber or short fiber segment as desired to achieve the target product properties.

As used herein, the phrase "non-cellulosic fibers" means the group of paper making fibers that are composed of either natural or man-made fibers that are composed of materials other than cellulose. Non-cellulosic fibers include but are not limited to man-made spun fibers, fibers from animal sources, and/or micro-algae. Additionally, fibers forming the products of the present invention may be spun from polymer melt compositions via suitable spinning operations, such as melt-blowing and/or spin-bonding and/or they may be obtained from natural sources. Such fibers may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like. Non-limiting examples of filaments include melt-blown and/or spun-bond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to thermoplastic polymer filaments, such as polyesters, nylons, polyolefins such as polypropylene filaments, polyethylene filaments, and biodegradable thermoplastic fibers such as polylactic acid filaments, polyhydroxyalkanoate filaments, polyesteramide filaments and polycaprolactone filaments. Non-limiting examples of fibers include pulp fibers, such as wood pulp fibers, and synthetic staple fibers such as polypropylene, polyethylene, polyester, copolymers thereof, rayon, glass fibers and polyvinyl alcohol fibers. Staple fibers may be produced by spinning a filament tow and then cutting the two into segments of less than 5.08 cm (2 in.) thus producing fibers. Non-cellulosic fibers may optionally be included in the towel or tissue paper webs up to a level of up to about 20%, preferably up to a level of up to about 10%, more preferably up to a level of up to about 5% and more preferably up to a level of up to about 2.5%.

"Synthetic polymer fibers" and like terminology also refer to non-cellulosic fibers made from synthetic polymers such as polyesters, nylons and polyolefins and so forth. Polyesters are generally obtained by known polymerization techniques from aliphatic or aromatic dicarboxylic acids with saturated aliphatic or aromatic diols. Preferred aromatic diacid monomers are the lower alkyl esters such as the dimethyl esters of terephthalic acid or isophthalic acid. Typical aliphatic dicarboxylic acids include adipic, sebacic, azelaic, dodecanedioic acid or 1,4-cyclohexanedicarboxylic acid. The preferred aromatic dicarboxylic acid or its ester or anhydride is esterified or trans-esterified and poly-condensed with the saturated aliphatic or aromatic diol. Typical saturated aliphatic diols preferably include the lower alkane-diols such as ethylene glycol. Typical cycloaliphatic diols include 1,4-cyclohexane diol and 1,4-cyclohexane dimethanol. Typical aromatic diols include aromatic diols such as hydroquinone, resorcinol and the isomers of naphthalene diol (1,5-; 2,6-; and 2,7-). Various mixtures of aliphatic and aromatic dicarboxylic acids and saturated aliphatic and aromatic diols may also be used. Most typically, aromatic dicarboxylic acids are polymerized with aliphatic diols to produce polyesters, such as polyethylene terephthalate (terephthalic acid+ethylene glycol). Additionally, aromatic dicarboxylic acids can be polymerized with aromatic diols to produce wholly aromatic polyesters, such as polyphenylene terephthalate (terephthalic acid+hydroquinone). Examples of polyesters include: polyethylene terephthalate; poly(1,4-butylene)terephthalate; and 1,4-cyclohexylene dimethylene terephthalate/isophthalate copolymer and other linear homopolymer esters derived from aromatic dicarboxylic acids, including isophthalic acid, bibenzoic acid, naphthalene-dicarboxylic acid including the 1,5-; 2,6-; and 2,7-naphthalene-dicarboxylic acids; 4,4,-diphenylene-dicarboxylic acid; bis(p-carboxyphenyl)methane acid; ethylene-bis-p-benzoic acid; 1,4-tetramethylene bis(p-oxybenzoic) acid; ethylene bis(p-tetramethylene acid; 1,3-trimethylene bis(p-oxybenzoic) acid; and 1,4-tetramethylene bis(p-oxybenzoic) acid, and diols selected from the group consisting of 2,2-dimethyl-1,3-propane diol; cyclohexane dimethanol and aliphatic glycols of the general formula $HO(CH_2)_nOH$ where n is an integer from 2 to 10, e.g., ethylene glycol; 1,4-tetramethylene glycol; 1,6-hexamethylene glycol; 1,8-octamethylene glycol; 1,10-decamethylene glycol; and 1,3-propylene glycol; and polyethylene glycols of the general formula $HO(CH_2CH_2O)_nH$ where n is an integer from 2 to 10,000, and aromatic diols such as hydroquinone, resorcinol and the isomers of naphthalene diol (1,5-; 2,6-; and 2,7). There can also be present one or more aliphatic dicarboxylic acids, such as adipic, sebacic, azelaic, dodecanedioic acid or 1,4-cyclohexanedicarboxylic acid.

Suitable polyolefin resins include material made by polymerizing such olefins as ethylene, propylene, butene-1, pentene-1,4-methylpent-1-ene, etc., in conventional manner. Useful polyolefins for fibers are high-density polyethylene (HDPE) and polypropylene. Other polyolefin homopolymers and copolymers of ethylene can be utilized in the practice of this invention. Such other polyolefins include low-density polyethylene (LDPE), very low-density polyethylene (VLDPE), linear low-density polyethylene (LLDPE) and polybutylene (PB). However, these other polyolefins can be blended with other polyolefins such as polypropylene or high-density polyethylene (HDPE).

Nylon or polyamide resins useful in the practice of the invention are well-known in the art and include semi-crystalline and amorphous resins, which may be produced for example by condensation polymerization of equimolar amounts of saturated dicarboxylic acids containing from 4 to 12 carbon atoms with diamines, by ring opening polymerization of lactams, or by copolymerization of polyamides with other components, e.g. to form polyether polyamide block copolymers. Examples of polyamides include polyhexamethylene adipamide (nylon 66), polyhexamethylene azelaamide (nylon 69), polyhexamethylene sebacamide (nylon 610), polyhexamethylene dodecanoamide (nylon 612), polydodecamethylene dodecanoamide (nylon 1212), polycaprolactam (nylon 6), polylauric lactam, poly-11-aminoundecanoic acid, and copolymers of adipic acid, isophthalic acid, and hexamethylene diamine.

Synthetic polymer fibers are generally hydrophobic as compared with cellulose and lack anionic sites for bonding to wet strength resins or enough hydroxyl groups to hydrogen bond effectively to pulp-derived fiber. Suitable fibers used in connection with this invention include melt-spun fibers, melt-blown fibers, splittable fibers having multiple segments and especially segmented bicomponent fibers which are splittable into their segments by refining in a disk refiner. One suitable fiber available from Fiber Innovation Technology is a 16-segment, 2-denier nylon/polyester bicomponent fiber having a characteristic fineness of 0.125 denier, discussed below.

Segmented fiber preparation for making splittable fibers is generally known in connection with thermoplastic fibers, where fibers having segments formed of different polymers. See, for example, U.S. Pat. No. 5,759,926 to Pike et al., as well as U.S. Pat. No. 5,895,710 to Sasse et al. and United States Patent Application Publication No. 2003/0203695 (U.S. patent application Ser. No. 10/135,650) of Polanco et al.

The splittable fibers produced and utilized in connection with this invention may have a segmented pie shape, an island in the sea configuration, a side-by-side configuration, a hollow configuration and so forth. See U.S. Pat. No. 4,735,849 to Murakami et al., FIGS. 6A-6D, as well as United States Patent Application Publication No. US 2002/0168912 (U.S. patent application Ser. No. 09/852,888), FIGS. 2-9. Splittable fibers are suitably disintegrated prior to incorporation into the furnish as is discussed below During the preparation of fibers for the paper making operation, softwood fiber and some hardwood fiber pulps are subjected to mechanical or chemical processing whereby the fibers are either compressed, subjected to high shear and/or chemically treated to make the fibers more flexible and create increased fiber to fiber bonding area through fiber fibrillation, fiber swelling and increased fiber flexibility. Those skilled in the art will recognize three predominate products of refining a pulp fiber are; 1) a percentage fibers are not impacted at all depending upon refining intensity and consistency, 2) a significant percentage of fibers are fibrillated whereby the fiber cell wall is delaminated and microfibrils are exposed that remain bound to the original fiber, and 3) a percentage of fibers and microfibrils are cut or mechanically broken into very small pieces (<200 micron in length) and this fraction is referred to as the fines fraction. These fines can either primary (those that exist in the native wood source) or secondary (those created during the act of refining). What has been discovered is that that by altering refining intensity, consistency and other processing conditions, a new fiber constituent can be created called herein "cellulose nanofilaments" and by optimizing the processing stages and unit operations a resultant pulp fiber stream containing greater 40% of individualized cellulose nanofilaments can be produced.

The "cellulose nanofilaments" used in the present invention may be derived from either softwood and/or hardwood and as such may contain fibrous elements of the softwood or hardwood. The cellulose nanofilaments are used in the processes of making absorbent towels or soft sanitary tissues in addition into the refined pulp fiber mixture of the papermaking furnish. The cellulose nanofilaments are added at a level of from about 0.05% to about 20.0%, preferably from about 0.1% to about 10.0%, more preferably from about 0.2% to about 5%, and even more preferably from about 0.5 to about 2% by weight of the dry fiber basis of the desired paper web.

In the processes contemplated in the present invention, the cellulose nanofilaments are preferably added to the refined softwood pulp fiber mixture along with the softwood pulp fibers and the strengthening additive. In one embodiment the cellulose nanofilaments are added to the softwood pulp fiber mixture before the strengthening additive. In a separate embodiment the cellulose nanofilaments are added to the softwood pulp fiber mixture after the strengthening additive.

The cellulose nanofilament size and high aspect ratio distinguish this material as a unique fiber class and not characterized as either a softwood or hardwood material. By high aspect ratio it is meant a fiber length divided by fiber width of at least 200 to about 5000, preferably greater than about 600 to about 1000. The cellulose nanofilament has an average width in the nanometer range, for example an average width of about 30 nm to about 500 nm, and an average length in the micrometer range or above, for example an average length about 100 um, preferable from about 200 um to about 2 mm. The cellulose nanofilaments have an average thickness of from about 20 nm to about 60 nm, preferably from about 30 nm to about 50 nm, more preferably from about 35 nm to about 45 nm. Such cellulose nanofilaments can be obtained, for example, from a process which uses mechanical means only, for example, the methods disclosed in U.S. patent application Publication no. 2013/0017394, file Jan. 19, 2012. In addition, cellulose nanofilaments can be made from a variety of processes as long as the specified geometry is maintained. Processes used to create cellulose nanofilaments include but are not limited to modified refining equipment, homogenizers, sonic fiber treatment, and chemical fiber treatment including enzymatic fiber modification.

In the paper "*Nanocellulose Patent Trends: A Comprehensive Review on Patents on Cellulose Nanocrystals, Microfibrillated and Bacterial Cellulose*", Charreau et al, Nanotechnology, 2013 7, 56-80, the author reviews the various terms to refer to mircofibrillated cellulose (MFC) over the years and "cellulose nanofilaments" could fit into these general terms. The "cellulose nanofilament" material of the present disclosure is specifically the result of the process disclosed in publication US20130017394 A1 entitled "Cellulose nanofilaments and method for their production", Hua, X., et al. The material produced by this process is unique in that the process disclosed produces cellulose nanofilaments with aspect ratios (Length/width) significantly higher than previously disclosed materials.

The cellulose nanofilaments that are the basis to this invention are structurally very different from other cellulose fibrils such as micro-fibrillated cellulose (MFC) or nanofibrillated cellulose (NFC) prepared using other methods for mechanical disintegration of wood pulp fibers in that they have at least 40%, preferably 75% and more preferably 90% by weight of the filaments of the fibrillated cellulose material have a filament length up to 300-350 um and diameters of approximately 100-500 nm. The fibrillated cellulose material in MFC typically has lengths shorter than 100 um while the fibrillated cellulose material in NFC typically has lengths shorter than 1 um. However it should be recognized by those skilled in the art that in the production of cellulose nanofilaments material, like other fibrillated cellulose materials produced using mechanical means are not homogeneous material with one single dimension value. The cellulose nanofilaments in the preferred embodiment have lengths of up to 300-350 um and diameters of approximately 100-500 nm and are produced by multiples, high consistency refining of wood or plant fibers and with no less than 50% by weight of its cellulose nanofilaments having lengths of up to 300-350 um and diameters of approximately 100-500 nm. The precise percentage of the cellulose nanofilaments material having lengths of up to 300-350 um and diameters of approximately 100-500 nm depends on the total energy input, the number of refining passes, the refining intensity and other refining operating conditions. The cellulose nanofilament material described above and the preferred blend of a refined pulp stream containing >50% cellulose nanofilaments within a refined pulp stream are the basis for this invention.

Another envisioned application of cellulose nanofilaments contemplated in this invention is the inclusion of a small percentage of either pure cellulose nanofilaments and/or a mixture of cellulose nanofilaments and other refining products to a virgin or recycled pulp stream before being shipped to a paper making site. In this way a virgin fiber source can be enhanced via cellulose nanofilament addition and then the cellulose nanofilaments can be added to a paper making process without introducing a new fiber dosing stream. By dosing cellulose with cellulose nanofilaments at a pulp production facility one could produce what could be termed a "super pulp" with characteristics only possible through cellulose nanofilament inclusion. Therefore many different methods for cellulose monofilament addition are considered in the invention and these include but are not limited to direct pure cellulose nanofilament inclusion, including a mixture of cellulose nanofilaments and other refining byproducts with a preferred nanocellulose content of >50% and cellulose nanofilaments being added via inclusion in virgin or recycled fiber before inclusion at the paper mill.

In alternative embodiments of the papermaking processes described herein, and the paper products made by those processes, the nanofilaments are delivered to the process, and thereby the paper, in a dry blend of micro- and nano-sized cellulose filaments. The blend may comprise a blend of cellulose nanofilaments, intact fibrillated fibers and cellulosic fines.

The phrase "Intact fibrillated cellulose fibers" or "Intact fibrillated fibers" as use herein, are cellulosic fibers that have undergone mechanical or chemical treatment during which individual or bundles of cellulosic filaments are liberated from the body of the fiber but remain joined to the fiber on one end creating more bonding area and increased fiber to fiber contact. The degree of treatment determines the number of cellulose nanofilaments that have been released from the fiber.

As used herein, the phrase "cellulosic fines", means the class of fibers materials that have a length <200 microns. These materials can include primary, or naturally occurring materials in a tree, or they can be classified as secondary, those created by either pulping and/or handling of pulp fibers and therefore can contain fiber sections and/or cellulose nanofilaments sections. Fines are not a homogenous material and are only used to represent a class of material with a defined length limitation.

When a blend of micro- and nano-sized cellulose filaments is used, the blend may comprise at least about 40%, preferably at least about 60%, more preferably at least about 75% by weight of the blend of cellulose nanofilaments; at least about 10%, preferably at least about 20%, more preferably at least about 30% by weight of the blend of intact fibrillated fibers; and at least about 5%, preferably at least about 10%, more preferably at least about 20% by weight of the blend of cellulosic fines.

The fibrous structure of the present invention may be homogeneous or may be layered. If layered, the fibrous structures may comprise at least two and/or at least three and/or at least four and/or at least five layers.

"Basis weight as used herein is the weight per unit area of a sample reported in lbs/3000 ft$^2$ or g/m$^2$. The fibrous towel structures and/or sanitary tissue products of the present invention may exhibit a basis weigh of between 10 g/m2 to about 120 g/m2 and/or from about 14 g/m2 to about 80 g/m2 and/or from about 20 g/m2 to about 60 g/m2.

Basis weight is measured by preparing one or more samples of a certain area (m$^2$) and weighing the sample(s) of a fibrous structure according to the present invention and/or a paper product comprising such fibrous structure on a top loading balance with a minimum resolution of 0.01 g. The balance is protected from air drafts and other disturbances using a draft shield. Weights are recorded when the readings on the balance become constant. The average weight (g) is calculated and the average area of the samples (m$^2$). The basis weight (g/m$^2$) is calculated by dividing the average weight (g) by the average area of the samples (m$^2$).

"Soft sanitary tissue product" as used herein means a soft low density (i.e. <about 0.15 g/cm3) web useful as a wiping implement for post-urinary and post-bowel movement cleaning (toilet tissue), for otorhinolaryngological discharges (facial tissue), and multi-functional absorbent and cleaning uses (absorbent towels). The sanitary tissue product prepared according to the present disclosure may be subjected to any suitable post processing including, but not limited to printing, embossing, calendaring, slitting, folding, combining with other fibrous structures and/or winding, and the like.

In one example of a soft tissue product of the present invention, the fibrous structure comprises from about 2% to 56.5% percent by weight of a refined softwood pulp fiber mixture. The refined softwood fiber mixture comprises from about 0% to about 56.4% by weight of the dry fiber basis of the soft tissue product of a soft wood pulp. The softwood pulp is optionally refined or not refined prior to combination with a strengthening additive. The strengthening additive is added to the aqueous stream in a manner that enables from about 0.05% to about 1.5% by weight of the dry fiber basis of the tissue product of the strengthening additive to be added to the paper making furnish. After combination of the long fiber wood pulp and cationic polymer, from about 0.05% to about 20.0% by weight of the dry fiber basis of the tissue paper web of cellulose nanofilaments are blended into the stream. In one embodiment of the invention this stream is then blended with about 43.5% to about 99.9% by weight of the dry fiber basis of the tissue product of hardwood pulp fiber mixture including both hardwood fibers and cellulose nanofilaments and formed into the fibrous sheet by any the processes discussed above. In another embodiment of the invention, the long fiber stream is fed into a separate layer or layers of the paper making system and isolated from the hardwood pulp fiber stream. This process embodiment produces a soft sanitary tissue product.

"Absorbent towel product" as used herein is a class of papermaking product that is designed and manufactured to meet the consumer need for liquid absorption and wet scrubbing along with soft hand feel. Absorbent product is made on the same paper making technology as sanitary tissue and facial tissue, but raw materials, paper making process setup, basis weight and other raw materials are optimized to deliver the desired consumer attributes.

In another example, a process for making an absorbent towel product, of the present invention the fibrous structure comprises from about 45% to 90% percent by weight of a refined softwood pulp fiber mixture. The long fiber softwood pulp fiber mixture comprises from about 20% to about 89.9% by weight of the dry fiber basis of the towel product of a long fiber soft wood pulp wherein the long fiber softwood pulp is optionally refined or not refined prior to combination with a strengthening additive. The strengthening additive is added to the aqueous stream in a manner that enables from about 0.05% to about 5.0% by weight of the dry fiber basis of the absorbent towel of strengthening additive to be added to the paper making furnish. After combination of the softwood pulp and cationic polymer, from about 0.05% to about 20%, by weight of the dry fiber basis of the tissue paper web of cellulose nanofilaments are blended into the stream. In this embodiment of the invention the softwood fibers, cellulose nanofilament and cationic stream is then blended with 10% to 55% by weight of the dry fiber basis of the towel product with of hardwood pulp fiber mixture and formed into the fibrous sheet by any of the processes discussed above. In another embodiment of the invention, the long fiber stream is fed into a separate layer or layers of the paper making system and isolated from the 10 to 55% by weight hardwood pulp fiber stream. This process embodiment produces a higher strength absorbent tissue web product.

Strengthening additives—The processes of the present application also comprise the addition of a strengthening additive to the papermaking furnish. Generally, strengthening additives may be applied in various amounts, depending on the desired characteristics of the web. For instance, in some embodiments, the total wet strength agents added can be between about 0.5 to 50 kg/T in some embodiments, between 2 to about 15 kg/T, and in some embodiments, between about 3 to about 5 kg/T. The strength polymers can be incorporated into any layer of the multi-layer tissue web.

The strengthening additives useful in this invention include without limitation cationic water soluble resins. These resins impart wet strength to paper sheets and are well known in paper making art. Such resins include polyamide epichlorohydrin (PAE), urea-formaldehyde resins, melamine formaldehyde resins, polyacrylamide resins, dialdehyde starches, and mixtures thereof.

In some embodiments, other strength agents can be utilized to further enhance the strength of a tissue product. As used herein, a "wet strength agent" is any material that, when added to pulp fibers can provide a resulting web or sheet with a wet geometric tensile strength to dry geometric tensile strength ration in excess of about 0.1. Typically these are termed either "permanent" wet strength or "temporary" wet strength agents. As is well known in the art, temporary and permanent wet strength agents may also sometimes function as dry strength agents to enhance the strength of the tissue product when dry. The listing of optional chemical ingredients are intended to barely exemplary in nature, and are not meant to limit the scope of the invention. Other materials may be included as well so long as they do not interfere or counteract the advantages of the present invention.

Wet strength agents may be applied in various amounts, depending on the desired characteristics of the web. For instance, in some embodiments, the total wet strength agents added can be between about 0.5 to 50 kg/T in some embodiments, between 2 to about 15 kg/T, and in some embodiments, between about 3 to about 5 kg/T of the strength agents can be incorporated into any layer of the multi-layer tissue web. The cationic wet strength resins useful in this invention include without limitation cationic water soluble resins. These resins impart wet strength to paper sheets and are well known in paper making art. This resin may impart either temporary or permanent wet strength to the fibrous sheet. Such resins include polyamide epichlorohydrin (PAE), urea-formaldehyde resins, melamine formaldehyde resins, polyacrylamide resins, dialdehyde starches, and mixtures thereof.

The strength additive may be selected from the group consisting of permanent wet strength resins, temporary wet strength resins, dry strength additives, and mixtures thereof. If permanent wet strength is desired, the chemical papermaking additive can be chosen from the following group of chemicals: polyamidpichlorohydrin, polyacrylamides, insolubilized polyvinyl alcohol; ureaormaldehyde; polyethyleneimine; and chitosan polymers. Polyamideepichlorohydrin resins are cationic wet strength resins which have been found to be of particular utility. Suitable types of such resins are described in U.S. Pat. No. 3,700,623, issued on Oct. 24, 1972, and U.S. Pat. No. 3,772,076, issued on Nov. 13, 1973, both issued to Keim. One commercial source of a useful polyamideepichlorohydrin resins is Hercules, Inc. of Wilmington, Del., which markets such resin under the trademark KYMENE® 557H.

Polyacrylamide resins have also been found to be of utility as wet strength resins. These resins are described in U.S. Pat. No. 3,556,932, issued on Jan. 19, 1971, to Coscia, et al. and U.S. Pat. No. 3,556,933, issued on Jan. 19, 1971, to Williams et al. One commercial source of polyacrylamide resins is American Cyanamid Co. of Stanford, Conn., which markets one such resin under the mark PAREZ® 631 NC.

Still other water-soluble cationic resins finding utility in this invention are urea formaldehyde and melamine formaldehyde resins. The more common functional groups of these polyfunctional resins are nitrogen containing groups such as amino groups and methylol groups attached to nitrogen. Polyethylenimine type resins may also find utility in the present invention.

If temporary wet strength is desired, the chemical papermaking additive can be chosen from the following group of chemicals: cationic dialdehyde starch-based resin (such as Caldas produced by Japan Carlet, National Starch 78-0080 or Cobond 1000, both produced by National Starch and Chemical Corporation); and dialdehyde starch. Modified starch temporary wet strength resins are also described in U.S. Pat. No. 4,675,394, Solarek, et al. issued Jun. 23, 1987. Preferred temporary wet strength resins include those described in U.S. Pat. No. 4,981,557 issued on Jan. 1, 1991, to Bjorkquist. Another example of a preferred temporary wet strength resin is PAREZ® 750B, a commercially available modified polyacrylamide resin manufactured by CyTec. If dry strength is desired, the chemical papermaking additive can be chosen from the following group of chemicals. Polyacrylamide (such as combinations of Cypro 514 and ACCOSTRENGTH 711 produced by American Cyanamid of Wayne, N.J.); starch (such as corn starch or potato starch); polyvinyl alcohol (such as AIRVOL 540 produced by Air Products Inc of Allentown, Pa.); guar or locust bean gums; and/or carboxymethyl cellulose (such as AQUALON CMC-T from Aqualon Co., Wilmington, Del.). In general, suitable starch for practicing the present invention is characterized by water solubility, and hydrophilicity. Exemplary starch materials include corn starch and potato starch, albeit it is not intended to thereby limit the scope of suitable starch materials; and waxy corn starch that is known industrially as amioca starch is particularly preferred. Amioca starch differs from common corn starch in that it is entirely amylopectin, whereas common corn starch contains both amplopectin and amylose. Various unique characteristics of amioca starch are further described in "Amioca—The Starch From Waxy Corn", H. H. Schopmeyer, Food Industries, December 1945, pp. 106-108 (Vol. pp. 1476-1478). The starch can be in granular or dispersed form albeit granular form is preferred. The starch is preferably sufficiently cooked to induce swelling of the granules. More preferably, the starch granules are swollen, as by cooking, to a point just prior to dispersion of the starch granule. Such highly swollen starch granules shall be referred to as being "fully cooked." The conditions for dispersion in general can vary depending upon the size of the starch granules, the degree of crystallinity of the granules, and the amount of amylose present. Fully cooked amioca starch, for example, can be prepared by heating an aqueous slurry of about 4% consistency of starch granules at about 190° F. (about 88° C.) for between about 30 and about 40 minutes. Other exemplary starch materials which may be used include modified cationic starches such as those modified to have nitrogen containing groups such as amino groups and methylol groups attached to nitrogen, available from National Starch and Chemical Company, (Bridgewater, N.J.). Such modified starch materials have heretofore been used primarily as a pulp furnish additive to increase wet and/or dry strength. However, when applied in accordance with this invention by application to a tissue paper web they may have reduced effect on wet strength relative to wet-end addition of the same modified starch materials. Considering that such modified starch materials are more expensive than unmodified starches, the latter have generally been preferred. These wet and dry strength resins may be added to the pulp furnish in addition to being added by the process described in this invention. It is to be understood that the addition of chemical compounds such as the wet strength and temporary wet strength resins discussed above to the pulp furnish is optional and is not necessary for the practice of the present development.

In preferred embodiments of the process of the present invention, the strengthening additive is added to the furnish in an amount ranging from about 0.05% to about 5.0%, preferably from about 0.05% to about 3.0%, more preferably from about 0.1% to about 1.5%, even more preferably from about 0.5% to about 1.5% by weight of the dry fiber basis of the absorbent towel or sanitary tissue product being produced. In general, processes to manufacture absorbent towel products add higher levels of polymers where the polymer is added up to about 5.0%, preferably up to about 3.0% and more preferably up to about 1.5%. Conversely, processes to produce sanitary tissue products add slightly lower levels of strengthening polymers where the polymer if added up to about 3.0% and preferably up to about 1.5%.

Optional Ingredients—Chemical Papermaking Additives:

If desired, various chemical additive compositions may optionally be used to further enhance consumer desired benefits such as softness, lower lint, absorbency, sheet flexibility, and temporary and/or permanent wet strength. The chemical additives are selected from the group consisting of de-bonders, silicon softening additives, non-silicon softening additives, absorbency additives and aesthetic additives.

De-Bonders

A chemical de-bonder can also be applied to soften the web. Specifically, a chemical de-bonder can reduce the amount of hydrogen bond within one or more layers of the web, which results in a softer product. Depending upon the desired characteristics of the resulting tissue product, the de-bonder can be applied in an amount between 0% to about 3.0%, preferably from about 0.1 to about 2.0% and more preferably from about 0.5 to about 1.0% by weight of the dry fiber basis of the paper web. The de-bonder can be incorporated into any layer of the single or multilayer tissue web.

Suitable de-bonders for use as softener additives in the present invention include both cationic and noncationic surfactants, with cationic surfactants being preferred. Noncationic surfactants include anionic, nonionic, amphoteric, and zwitterionic surfactants. Preferably, the surfactant is substantially nonmigratory in situ after the tissue paper has been manufactured in order to substantially obviate post-manufacturing changes in the tissue paper's properties which might otherwise result from the inclusion of surfactant. This may be achieved, for instance, through the use of surfactants having melt temperatures greater than the temperatures commonly encountered during storage, shipping, merchandising, and use of tissue paper product embodiments of the invention: for example, melt temperatures of about 50° C. or higher.

The level of noncationic surfactant applied to tissue paper webs to provide the aforementioned softness/tensile benefit ranges from the minimum effective level needed for imparting such benefit, on a constant tensile basis for the end product, to about 2%: preferably between about 0.01% and about 2% noncationic surfactant is retained by the web; more preferably, between about 0.05% and about 1.0%; and, most preferably, between about 0.05% and about 0.3%. The surfactants preferably have alkyl chains with eight or more carbon atoms. Exemplary anionic surfactants are linear alkyl sulfonates, and alkylbenzene sulfonates. Exemplary non-ionic surfactants are alkylglycosides including alkylglycoside esters such as CRODESTA® SL-40 which is available from Croda, Inc. (New York, N.Y.); alkylglycoside ethers as described in U.S. Pat. No. 4,011,389, issued to W. K. Langdon, et al. on Mar. 8, 1977; alkylpolyethoxylated esters such as PEGOSPERSE® 200 ML available from Glyco Chemicals, Inc. (Greenwich, Conn.); alkylpolyethoxylated ethers and esters such as NEODOLR 25-12 available from Shell Chemical Co; sorbitan esters such as SPAN 60 from ICI America, Inc, ethoxylated sorbitan esters, propoxylated sorbitan esters, mixed ethoxylated propoxylated sorbitan esters, and polyethoxylated sorbitan alcohols such as TWEEN 60 also from ICI America, Inc. Alkylpolyglycosides are particularly preferred for use in the present invention. The above listings of exemplary surfactants are intended to be merely exemplary in nature, and are not meant to limit the scope of the invention.

Silicons

If a chemical softener that functions primarily by imparting a lubricous feel is desired a polysiloxane or "silicon" can be used. Depending upon the desired characteristics of the resulting tissue product, the silicon can be applied in an amount between 0% to about 3.0%, preferably from about 0.1 to about 2.0% and more preferably from about 0.5 to about 1.0% by weight of the dry fiber basis of the paper web. The silicon can be incorporated into any layer of the single or multilayer tissue web. Suitable silicon compounds for use in the present invention are described in detail below.

The polysiloxane compounds preferably have monomeric siloxane units of the following structure:

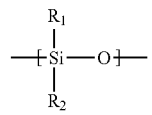

wherein, R1 and R2, for each independent siloxane monomeric unit can each independently be hydrogen or any alkyl, aryl, alkenyl, alkaryl, arakyl, cycloalkyl, halogenated hydrocarbon, or other radical. Any of such radicals can be substituted or unsubstituted. R1 and R2 radicals of any particular monomeric unit may differ from the corresponding functionalities of the next adjoining monomeric unit. Additionally, the polysiloxane can be either a straight chain, a branched chain or have a cyclic structure. The radicals R1 and R2 can additionally independently be other silaceous functionalities such as, but not limited to siloxanes, polysiloxanes, silanes, and polysilanes. The radicals R1 and R2 may contain any of a variety of organic functionalities including, for example, alcohol, carboxylic acid, aldehyde, ketone and amine, amide functionalities, with amino functional silicone compounds being preferred. Exemplary alkyl radicals are methyl, ethyl, propyl, butyl, pentyl, hexyl, octyl, decyl, octadecyl, and the like. Exemplary alkenyl radicals are vinyl, allyl, and the like. Exemplary aryl radicals are phenyl, diphenyl, naphthyl, and the like. Exemplary alkaryl radicals are toyl, xylyl, ethylphenyl, and the like. Exemplary arakyl radicals are benzyl, alpha-phenylethyl, beta-phenyl-ethyl, alpha-phenylbutyl, and the like. Exemplary cycloalkyl radicals are cyclobutyl, cyclopentyl, cyclohexyl, and the like. Exemplary halogenated hydrocarbon radicals are chloromethyl, bromoethyl, tetrafluorethyl, fluorethyl, trifluorethyl, trifluorotoyl, hexafluoroxylyl, and the like. References disclosing polysiloxanes include U.S. Pat. No. 2,826,551, issued Mar. 11, 1958 to Geen; U.S. Pat. No. 3,964,500, issued Jun. 22, 1976 to Drakoff; U.S. Pat. No. 4,364,837, issued Dec. 21, 1982, Pader, U.S. Pat. No. 5,059,282, issued Oct. 22, 1991 to Ampulski et al.; and British Patent No. 849,433, published Sep. 28, 1960 to Woolston. Also, Silicon Compounds, pp 181-217, distributed by Petrarch Systems, Inc., 1984, contains an extensive listing and description of polysiloxanes in general.

Softening Additives

Any surfactant other than the chemical papermaking additive emulsifying surfactant material, is hereinafter referred to as "surfactant," and any surfactant present as the emulsifying component of emulsified chemical papermaking additives is hereinafter referred to as "emulsifying agent". The surfactant may be applied to the tissue paper alone or simultaneously with, after, or before other chemical papermaking additives. In a typical process, if another additive is present, the surfactant is applied to the cellulosic substrate simultaneously with the other additive(s). It may also be desirable to treat a de-bonder containing tissue paper with a relatively low level of a binder for lint control and/or to increase tensile strength.

If a chemical softener that functions primarily by imparting a lubricous feel is desired, it can be chosen from the following group of chemicals. Organic materials (such as mineral oil or waxes such as paraffin or carnuba, or lanolin); and polysiloxanes (such as the compounds described in U.S. Pat. No. 5,059,282 issued to Ampulski). Suitable polysiloxane compounds for use in the present invention are described in detail below.

If a chemical softener that functions primarily by plasticizing the structure is desired, it can be chosen from the following group of chemicals: polyethylene glycol (such as PEG 400); dimethylamine; and/or glycerin.

If a cationic chemical softener that functions primarily by debonding is desired, it can be chosen from the following group of chemicals. Cationic quaternary ammonium compounds (such as dihydrogenated tallow dimethyl ammonium methyl sulfate (DTDMAMS) or dihydrogenated tallow dimethyl ammonium chloride (DTDMAC) both produced by Witco Corporation of Greenwich, Conn.; Berocel 579 (produced by Eka Nobel of Stennungsund, Sweden); materials described in U.S. Pat. Nos. 4,351,699 and 4,447,294 issued to Osborn; and/or diester derivatives of DTDMAMS or DTDMAC.) In particular, quaternary ammonium compounds having the formula:

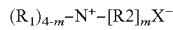

$(R_1)_{4-m}-N^+-[R2]_m X^-$ m is 1 to 3;
each $R_1$ is a $C_1$-$C_8$ alkyl group, hydroxyalkyl group, hydrocarbyl or substituted hydrocarbyl group, alkoxylated group, benzyl group, or mixtures thereof; each $R_2$ is a $C_9$-$C_{41}$ alkyl group, hydroxyalkyl group, hydrocarbyl or substituted hydrocarbyl group, alkoxylated group, benzyl group, or mixtures thereof and $X^-$ is any softener-compatible anion are suitable for use in the present invention. Preferably, each $R_2$ is $C_{16}$-$C_{18}$ alkyl, most preferably each $R_2$ is straight-chain $C_{18}$ alkyl. Preferably, each $R_1$ is methyl and $X^-$ is chloride or methyl sulfate. Optionally, the $R_2$ substituent can be derived from vegetable oil sources. Biodegradable ester-functional quaternary ammonium compound having the formula:

$(R_1)_{4-m}-N^+-[(CH_2)_n-Y-R_2]_m X^-$ each Y=—O—(O)C—, or —C(O)—O—;
m=1 to 3; preferably, m=2;
each n=1 to 4; preferably, n=2;
each $R_1$ substituent is a short chain $C_1$-$C_6$, preferably $C_1$-$C_3$, alkyl group, e.g., methyl (most preferred), ethyl, propyl, and the like, hydroxyalkyl group, hydrocarbyl group, benzyl group or mixtures thereof; each $R_2$ is a long chain, at least partially unsaturated (IV of greater than about 5 to less than about 100, preferably from about 10 to about 85), $C_{11}$-$C_{23}$ hydrocarbyl, or substituted hydrocarbyl substituent and the counter-ion, $X^-$, can be any softener compatible anion, for example, acetate, chloride, bromide, methylsulfate, formate, sulfate, nitrate and the like can also be used in the present invention. Preferably, the majority of $R_2$ comprises fatty acyls containing at least 90% $C_{18}$-$C_{24}$ chainlength. More preferably, the majority of $R_2$ is selected from the group consisting of fatty acyls containing at least 90% $C_{18}$, $C_{22}$ and mixtures thereof.

Other types of suitable quaternary ammonium compounds are described in European Patent No. 0 688 901 A2, assigned to Kimberly-Clark Corporation, published Dec. 12, 1995.

Tertiary amine softening compounds can also be used in the present invention. Examples of suitable tertiary amine softeners are described in U.S. Pat. No. 5,399,241, assigned to James River Corporation, issued Mar. 21, 1995.

Absorbency Additives

If enhanced absorbency is desired, surfactants may be used to treat the paper webs of the present invention. The level of surfactant, if used, in one embodiment, can be from about 0.01% to about 2% by dry fiber weight basis of the tissue web. In one embodiment the surfactants have alkyl chains with eight or more carbon atoms. Alternatively, cationic softener active ingredients with a high degree of unsaturated (mono and/or poly) and/or branched chain alkyl groups can greatly enhance absorbency.

If an absorbency aid is desired that enhances the rate of absorbency it can be chosen from the following group of chemicals: polyethoxylates (such as PEG 400); alkyl ethoxylated esters (such as PEGOSPERSE 200 ML from Lonza Inc.); alkyl ethoxylated alcohols (such as Neodol); alkyl polyethoxylated nonylphenols (such as IGEPAL CO produced by Rhone-Poulenc/GAF), ethoxylate trimethyl pentanediol, and/or materials described in U.S. Pat. Nos. 4,959,125 and 4,940,513 issued to Spendel. In those instances where the surfactant debonder softener decreases wetting, a wetting agent, e.g., a second surfactant, may be added to the application solution. For example, a sorbitan stearate ester can be mixed with an alkyl polyethoxylated alcohol to produce a soft wettable paper.

Water soluble polyhydroxy compounds can also be used as absorbency aids and/or wetting agents. Examples of water soluble polyhydroxy compounds suitable for use in the present invention include glycerol, polyglycerols having a weight average molecular weight of from about 150 to about 800 and polyoxyethylene and polyoxypropylene having a weight-average molecular weight of from about 200 to about 4000, preferably from about 200 to about 1000, most preferably from about 200 to about 600. Polyoxyethylene having an weight average molecular weight of from about 200 to about 600 are especially preferred. Mixtures of the above-described polyhydroxy compounds may also be used. For example, mixtures of glycerol and polyglycerols, mixtures of glycerol and polyoxyethylenes, mixtures of polyglycerols and polyoxyethylenes, etc. are useful in the present invention. A particularly preferred polyhydroxy compound is polyoxyethylene having an weight average molecular weight of about 400. This material is available commercially from the Union Carbide Company of Danbury, Conn. under the trade name "PEG-400".

If an absorbency aid is desired that decreases the rate of absorbency it can be chosen from the following group of chemicals. Alkylketenedimers (such as AQUAPELR 360XC Emulsion manufactured by Hercules Inc., Wilmington, Del.); fluorocarbons (such as Scotch Guard by 3M of Minneapolis, Minn.) hydrophobic silicones (such as PDMS DC-200 by Dow Corning of Midland, Mich.), fluorotelomers (such as ZONYL 7040 by Dupont of Wilmington, Del.), etc.

The absorbency additive can be used alone or in combination with a strength additive. Starch based strength additives have been found to be the preferred binder for use in the present invention. Preferably, the tissue paper is treated with an aqueous solution of starch. In addition to reducing linting of the finished tissue paper product, low levels of starch also imparts a modest improvement in the tensile strength of tissue paper without imparting boardiness (i.e., stiffness) which would result from additions of high levels of starch. Also, this provides tissue paper having improved strength/softness relationship compared to tissue paper which has been strengthened by traditional methods of increasing tensile strength: for example, sheets having increased tensile strength due to increased refining of the pulp; or through the addition of other dry strength additives. This result is especially surprising since starch has traditionally been used to build strength at the expense of softness in applications wherein softness is not an important characteristic: for example, paperboard. Additionally, parenthetically, starch has been used as a filler for printing and writing paper to improve surface printability.

Aesthetic Additives

If an aesthetic additive is desired, it can be chosen from the following group of chemicals: inks; dyes; perfumes; opacifiers (such as TiO2 or calcium carbonate), optical brighteners, and mixtures thereof. The aesthetics of the paper can also be improved utilizing the process described in this invention. Inks, dyes, and/or perfumes are preferably added to the aqueous composition which is subsequently applied to the tissue paper web. The aesthetics additive may be applied alone or in combination with the wetting, softening, and/or strength additives.

Process for Making

In FIG. 1, a twin wire former having a papermaking headbox 1 injects or deposits a furnish of an aqueous suspension of papermaking fibers onto a plurality of forming fabrics, such as the outer forming fabric 5 and the inner forming fabric 3, thereby forming a wet tissue web 6. The forming process of the present disclosure may be any conventional forming process known in the papermaking industry. Such formation processes include, but are not limited to, Fourdriniers, roof formers such as suction breast roll formers, and gap formers such as twin wire formers and crescent formers.

The wet tissue web 6 forms on the inner forming fabric 3 as the inner forming fabric 3 revolves about a forming roll 4. The inner forming fabric 3 serves to support and carry the newly-formed wet tissue web 6 downstream in the process as the wet tissue web 6 is partially dewatered to a consistency of about 10 percent based on the dry weight of the fibers. Additional dewatering of the wet tissue web 6 may be carried out by known paper making techniques, such as vacuum suction boxes, while the inner forming fabric 3 supports the wet tissue web 6. The wet tissue web 6 may be additionally dewatered to a consistency of at least about 20 percent, more specifically between about 20 to about 40 percent, and more specifically about 20 to about 30 percent.

The forming fabric 3 can generally be made from any suitable porous material, such as metal wires or polymeric filaments. For instance, some suitable fabrics can include, but are not limited to, Albany 84M and 94M available from Albany International (Albany, N.Y.) Asten 856, 866, 867, 892, 934, 939, 959, or 937; Asten Synweve Design 274, all of which are available from Asten Forming Fabrics, Inc. (Appleton, Wis.); and Voith 2164 available from Voith Fabrics (Appleton, Wis.). Forming fabrics or felts comprising nonwoven base layers may also be useful, including those of Scapa Corporation made with extruded polyurethane foam such as the Spectra Series.

The wet web 6 is then transferred from the forming fabric 3 to a transfer fabric 8 while at a solids consistency of between about 10 to about 40 percent, and particularly, between about 20 to about 30 percent. As used herein, a "transfer fabric" is a fabric that is positioned between the forming section and the drying section of the web manufacturing process.

Transfer to the transfer fabric 8 may be carried out with the assistance of positive and/or negative pressure. For example, in one embodiment, a vacuum shoe 9 can apply negative pressure such that the forming fabric 3 and the transfer fabric 8 simultaneously converge and diverge at the leading edge of the vacuum slot. Typically, the vacuum shoe 9 supplies pressure at levels between about 10 to about 25 inches of mercury. As stated above, the vacuum transfer shoe 9 (negative pressure) can be supplemented or replaced by the use of positive pressure from the opposite side of the web to blow the web onto the next fabric. In some embodiments, other vacuum shoes can also be used to assist in drawing the fibrous web 6 onto the surface of the transfer fabric 8.

Typically, the transfer fabric 8 travels at a slower speed than the forming fabric 3 to enhance the MD and CD stretch of the web, which generally refers to the stretch of a web in its cross (CD) or machine direction (MD) (expressed as percent elongation at sample failure). For example, the relative speed difference between the two fabrics can be from about 1 to about 30 percent, in some embodiments from about 5 to about 20 percent, and in some embodiments, from about 10 to about 15 percent. This is commonly referred to as "rush transfer". During "rush transfer", many of the bonds of the web are believed to be broken, thereby forcing the sheet to bend and fold into the depressions on the surface of the transfer fabric 8. Such molding to the contours of the surface of the transfer fabric 8 may increase the MD and CD stretch of the web. Rush transfer from one fabric to another can follow the principles taught in any one of the following patents, U.S. Pat. Nos. 5,667,636, 5,830,321, 4,440,597, 4,551,199, 4,849,054.

The wet tissue web 6 is then transferred from the transfer fabric 8 to a through-air drying fabric 11. Typically, the transfer fabric 8 travels at approximately the same speed as the through-air drying fabric 11. However, it has now been discovered that a second rush transfer may be performed as the web is transferred from the transfer fabric 8 to a through-air drying fabric 11. This rush transfer is referred to herein as occurring at the second position and is achieved by operating the through-air drying fabric 11 at a slower speed than the transfer fabric 8. By performing rush transfer at two distinct locations, i.e., the first and the second positions, a tissue product having increased CD stretch may be produced.

In addition to rush transferring the wet tissue web from the transfer fabric 8 to the through-air drying fabric 11, the wet tissue web 6 may be macroscopically rearranged to conform to the surface of the through-air drying fabric 11 with the aid of a vacuum transfer roll 12 or a vacuum transfer shoe like the vacuum shoe 9. If desired, the through-air drying fabric 11 can be run at a speed slower than the speed of the transfer fabric 8 to further enhance MD stretch of the resulting absorbent tissue product. The transfer may be carried out with vacuum assistance to ensure conformation of the wet tissue web 6 to the topography of the through-air drying fabric 11.

The processes of the present disclosure comprise the step of drying the respective webs until the web contains not more than about 10%, preferably not more than about 8%, more preferably not more than about 6% by weight moisture.

While supported by the through-air drying fabric 11, the wet tissue web 6 is dried to a final consistency of about 94 percent or greater by a through-air dryer 13. The web 15 then passes through the winding nip between the reel drum 22 and the reel 23 and is wound into a roll of tissue 25 for subsequent converting, such as slitting cutting, folding, and packaging.

The web is transferred to the through-air drying fabric for final drying preferably with the assistance of vacuum to ensure macroscopic rearrangement of the web to give the desired bulk and appearance. The use of separate transfer and through-air drying fabrics can offer various advantages since it allows the two fabrics to be designed specifically to address key product requirements independently. For example, the transfer fabrics are generally optimized to allow efficient conversion of high rush transfer levels to high MD stretch while through-air drying fabrics are designed to deliver bulk and CD stretch. It is therefore useful to have moderately coarse and moderately three-dimensional transfer fabrics and through-air drying fabrics which are quite coarse and three dimensional in the optimized configuration. The result is that a relatively smooth sheet leaves the transfer section and then is macroscopically rearranged (with vacuum assist) to give the high bulk, high CD stretch surface topology of the through-air drying fabric. Sheet topology is completely changed from transfer to through-air drying fabric and fibers are macroscopically rearranged, including significant fiber-fiber movement.

The drying process can be any non-compressive or compressive drying method which tends to preserve the bulk or thickness of the wet web including, without limitation, through-air drying, infra-red radiation, microwave drying, Valmet NTT, Voith ATMOS, etc. Because of its commercial availability and practicality, through-air drying is well known and is one commonly used means for non-compressively drying the web for purposes of this invention. Suitable through-air drying fabrics include, without limitation, fabrics with substantially continuous machine direction ridges whereby the ridges are made up of multiple warp strands grouped together, such as those disclosed in U.S. Pat. No. 6,998,024. Other suitable through-air drying fabrics include those disclosed in U.S. Pat. No. 7,611,607, particularly the fabrics denoted as Fred (t1207-77), Jeston (t1207-6) and Jack (t1207-12). The web is preferably dried to final dryness on the through-air drying fabric, without being pressed against the surface of a Yankee dryer, and without subsequent creping.

Once the wet tissue web 6 has been non-compressively dried, thereby forming the dried tissue web 15, it is possible to crepe the dried tissue web 15 by transferring the dried tissue web 15 to a Yankee dryer prior to reeling, or using alternative foreshortening methods such as micro-creping as disclosed in U.S. Pat. No. 4,919,877.

In the wound product, it is often advantageous to wind the product with the softest side facing the consumer, and hence the shearing process to increase the softness of this side is preferred. However, it is also possible to treat the air side of the web rather than the fabric side, and in these embodiments, it would be possible to increase the air-side softness to a level higher than that of the fabric side.

The process of the present disclosure is well suited to forming multi-ply tissue products. The multi-ply tissue products can contain two plies, three plies, or a greater number of plies. In one particular embodiment, a two-ply rolled tissue product is formed according to the present disclosure in which both plies are manufactured using the same papermaking process, such as, for example, un-creped through-air dried. However, in other embodiments, the plies may be formed by two different processes. Generally, prior to being wound in a roll, the first ply and the second ply are attached together. Any suitable manner for laminating the webs together may be used. For example, the process includes a crimping device that causes the plies to mechanically attach together through fiber entanglement. In an alternative embodiment, however, an adhesive may be used in order to attach the plies together.

Additionally, webs prepared according to the present disclosure may be subjected to any suitable post processing including, but not limited to, printing, embossing, calendaring, slitting, folding, combining with other fibrous structures, and the like.

What is claimed is:

1. A differential density soft sanitary tissue paper web comprising at least one ply, said differential density soft sanitary tissue paper web comprising:
    a) from about 2% to about 56.5% by weight of said differential density soft sanitary tissue paper web of a softwood pulp fiber mixture, said softwood pulp fiber mixture comprising:
        1) from about 0% to about 56.4% by weight of the dry fiber basis of said differential density soft sanitary tissue paper web of softwood pulp fiber;
        2) from about 0.05% to about 20.0% by weight of the dry fiber basis of said differential density soft sanitary tissue paper web of cellulose nanofilaments; and,
        3) from about 0.05% to about 3.0% by weight of the dry fiber basis of said differential density soft sanitary tissue paper web of strengthening additive; and,
    b) from about 43.5% to about 99.9% by weight of the dry fiber basis of said differential density soft sanitary tissue paper web of a hardwood pulp fiber mixture.

2. The differential density soft sanitary tissue paper web of claim 1 wherein said softwood pulp fiber is refined.

3. The differential density soft sanitary tissue paper web of claim 1 further comprising up to about 20% by weight of the dry fiber basis of said differential density soft sanitary tissue paper web of a fiber selected from the group consisting of fibrillated man-made cellulose, non-wood natural fibers, non-cellulosic fibers, and combinations thereof.

4. The differential density soft sanitary tissue paper web of claim 1 further comprising less than about 2.0% by weight of a chemical papermaking additive selected from the group consisting of debonders, silicone, softening additives, absorbency additives, aesthetic additives, and combinations thereof.

5. The differential density soft sanitary tissue paper web of claim 1 wherein said differential density soft sanitary tissue paper web comprises at least two plies.

6. The differential density soft sanitary tissue paper web of claim 5 wherein said differential density soft sanitary tissue paper web comprises at least three plies.

7. The differential density soft sanitary tissue paper web of claim 6 wherein said differential density soft sanitary tissue paper web comprises at least four plies.

8. The differential density soft sanitary tissue paper claim 1 wherein said cellulose nanofilaments are high aspect ratio cellulose nanofilaments.

9. The differential density soft sanitary tissue paper claim 1 further comprising from about 0.1% to about 10% by weight of the dry fiber basis of said differential density soft sanitary tissue paper web of said cellulose nanofilaments.

10. The differential density soft sanitary tissue paper claim 1 further comprising:

a) from 0% to about 3.0% by weight of the dry fiber basis of said differential density soft sanitary tissue paper web of a debonder; and, b) from 0% to about 3.0% by weight of the dry fiber basis of said differential density soft sanitary tissue paper web of a silicone.

11. A differential density soft sanitary tissue paper web comprising at least one ply, said differential density soft sanitary tissue paper web comprising:

(a) from about 2% to about 56.5% by weight of the dry fiber basis of said differential density soft sanitary tissue paper web of a softwood pulp fiber mixture, said softwood pulp fiber mixture comprising:

1) from about 0% to about 56.4% by weight of the dry fiber basis of said differential density soft sanitary tissue paper web of a softwood pulp fiber; and, 2) at least about 0.05% to about 20% by weight of the dry fiber basis of said differential density soft sanitary tissue paper web of a blend of cellulose micro-filaments and cellulose nano-filaments, wherein said blend of cellulose micro-filaments and cellulose nano-filaments comprises:

A) at least about 50% by weight of said blend of cellulose micro-filaments and cellulose nano-filaments of cellulose micro-filaments and cellulose nano-filaments;

B) at least about 10% by weight of said blend of cellulose micro-filaments and cellulose nano-filaments of intact fibrillated fibers; and C) at least about 5% by weight of said blend of cellulose micro-filaments and cellulose nano-filaments of cellulosic fines; and, b) from about 0.05% to about 3.0% by weight of the by weight of the dry fiber basis of said differential density soft sanitary tissue paper web of strengthening additive; and, c) from about 43.5% to about 99.9% by weight of the by weight of the dry fiber basis of said differential density soft sanitary tissue paper web of a hardwood pulp fiber mixture.

12. The differential density soft sanitary tissue paper web of claim 11 wherein said softwood pulp fiber is refined.

13. The differential density soft sanitary tissue paper web of claim 11 further comprising up to about 20% by weight of the dry fiber basis of said differential density soft sanitary tissue paper web of a fiber selected from the group consisting of fibrillated man-made cellulose, non-wood natural fibers, non-cellulosic fibers, and combinations thereof.

14. The differential density soft sanitary tissue paper web of claim 11 wherein said softwood pulp fiber mixture further comprises less than about 2.0% by weight of the dry fiber basis of said differential density soft sanitary tissue paper web of a chemical papermaking additive selected from the group consisting of debonders, silicones, softening additives, absorbency additives, aesthetic additives, and combinations thereof.

15. The differential density soft sanitary tissue paper web of claim 11 wherein said differential density soft sanitary tissue paper web comprises at least two plies.

16. The differential density soft sanitary tissue paper web of claim 15 wherein said differential density soft sanitary tissue paper web comprises at least three plies.

17. The differential density soft sanitary tissue paper web of claim 16 wherein said differential density soft sanitary tissue paper web comprises at least four plies.

18. The differential density soft sanitary tissue paper web of claim 11 wherein said cellulose micro-filaments and cellulose nano-filaments are high aspect ratio cellulose micro-filaments and cellulose nano-filaments.

19. The differential density soft sanitary tissue paper web of claim 11 further comprising from about 0.1% to about 10% by weight of the dry fiber basis of said differential density soft sanitary tissue paper web of said cellulose micro-filaments and cellulose nano-filaments.

20. The differential density soft sanitary tissue paper web of claim 11 further comprising:

a) from 0% to about 3.0% by weight of the dry fiber basis of said differential density soft sanitary tissue paper web of a debonder; and, b) from 0% to about 3.0% by weight of the dry fiber basis of said differential density soft sanitary tissue paper web.

* * * * *